United States Patent
Shimpi et al.

(10) Patent No.: US 10,229,416 B2
(45) Date of Patent: Mar. 12, 2019

(54) ISSUE EXTRACTION BASED ON TICKET MINING

(71) Applicant: Tata Consultancy Services Limited, Mumbai (IN)

(72) Inventors: Vikrant Vikas Shimpi, Pune (IN); Maitreya Natu, Pune (IN); Vaishali Sadaphal, Pune (IN); Vaishali Kulkarni, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 596 days.

(21) Appl. No.: 14/918,244

(22) Filed: Oct. 20, 2015

(65) Prior Publication Data

US 2016/0110723 A1  Apr. 21, 2016

(30) Foreign Application Priority Data

Oct. 20, 2014  (IN) .......................... 3351/MUM/2014

(51) Int. Cl.

| G06F 17/30 | (2006.01) |
|---|---|
| G06Q 30/00 | (2012.01) |
| G06Q 10/06 | (2012.01) |
| G06F 17/27 | (2006.01) |
| G06F 11/00 | (2006.01) |
| G06F 21/57 | (2013.01) |
| G06Q 10/00 | (2012.01) |

(52) U.S. Cl.
CPC ..... *G06Q 30/016* (2013.01); *G06F 17/30722* (2013.01); *G06Q 10/063* (2013.01)

(58) Field of Classification Search
USPC .......................................................... 705/304
See application file for complete search history.

(56) References Cited

U.S. PATENT DOCUMENTS

| 9,092,802 | B1* | 7/2015 | Akella ............... G06Q 30/0256 |
|---|---|---|---|
| 2004/0120250 | A1* | 6/2004 | Langevin ............ H04L 41/0213 |
| | | | 370/216 |
| 2013/0268260 | A1* | 10/2013 | Lundberg ................ G06F 17/28 |
| | | | 704/8 |
| 2016/0080567 | A1* | 3/2016 | Hooshiari ............. H04M 3/493 |
| | | | 379/88.01 |
| 2016/0224662 | A1* | 8/2016 | King ................. G06F 17/30705 |

\* cited by examiner

*Primary Examiner* — Mark A Fleischer
(74) *Attorney, Agent, or Firm* — Schwegman Lundberg & Woessner, P.A.

(57) ABSTRACT

Described herein are a method and a system for extracting issues based on ticket mining. In one implementation, a plurality of tickets comprising descriptions of the issues in computing systems are received. The received descriptions are then cleaned by removing unwanted details. Upon cleaning, the clean descriptions are mapped with descriptions stored in service catalog data to obtain unmapped clean descriptions. In an example, the unmapped clean descriptions include one of user-generated descriptions, system-generated descriptions, and both the user-generated descriptions and the system-generated descriptions. For the user-generated descriptions; the issues are extracted by pre-processing the user-generated descriptions, determining keywords from the processed unmapped clean descriptions, constructing n-grams of keywords from the extracted keywords, and extracting the n-grams of keywords as the issues present in the computing systems.

12 Claims, 3 Drawing Sheets

ISSUE EXTRACTION BASED ON TICKET MINING

CLAIM OF PRIORITY

This application claims the benefit of priority under 35 U.S.C. § 119 to Indian Patent Application No. 3351/MUM/2014, filed on Oct. 20, 2014, which is incorporated by reference herein in its entirety.

TECHNICAL FIELD

The present subject matter relates to issue extraction and, particularly but not exclusively, methods and systems for extracting issues based on ticket mining.

BACKGROUND

Information technology (IT) systems of today's enterprises are continuously monitored and managed by a team of resolvers. Any issue in an IT system is reported in the form of tickets, such as trouble tickets. A ticket may contain various details of an observed issue, such as reporting time, system-of-origin, and severity. In addition, the ticket may include information of the actual issue which is hidden in the ticket description along with other information. Knowledge of the actual issue enables the team of resolvers to improvise cost and quality of operations.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
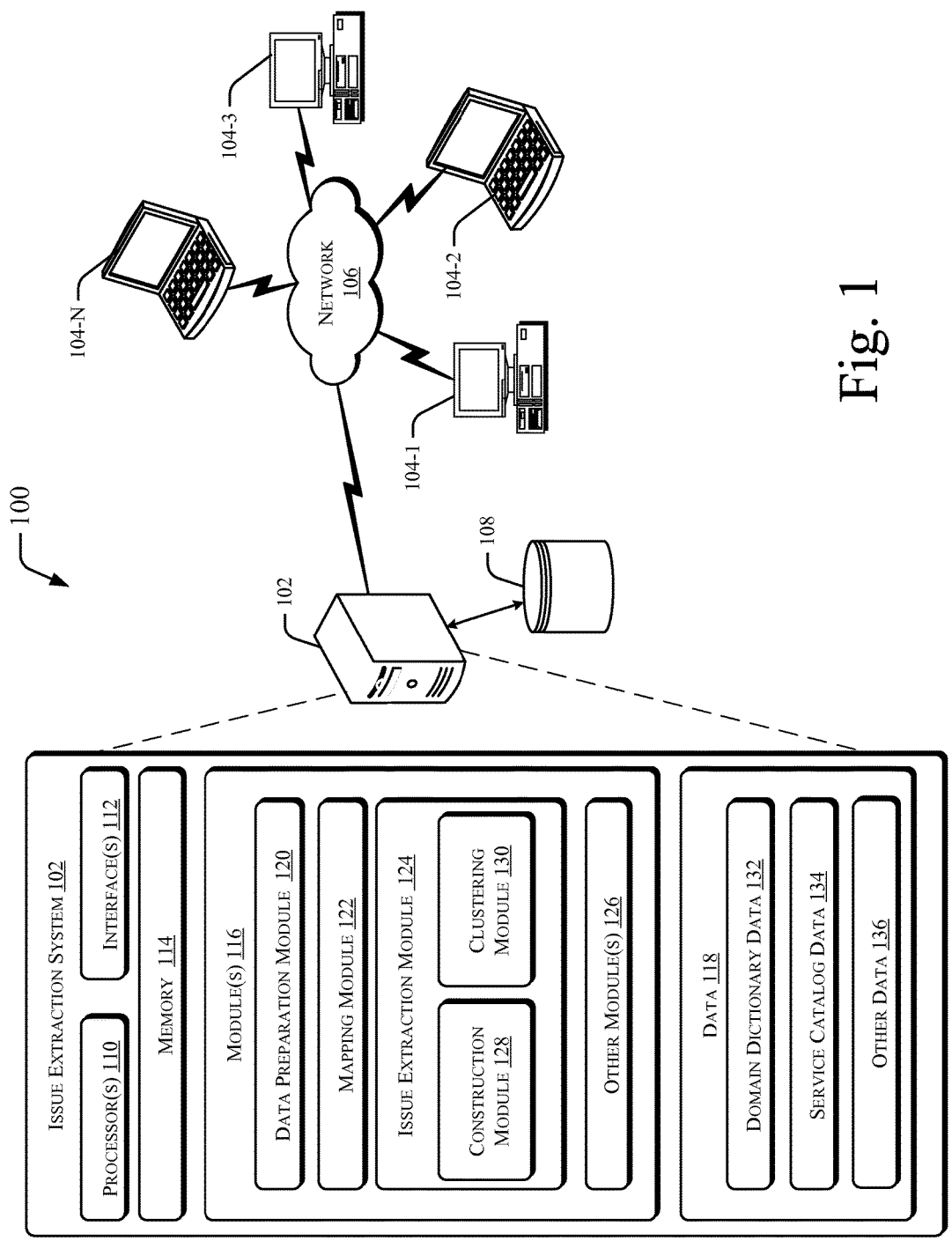
FIG. 1 illustrates an issue extraction system for identifying issues in a computing system, according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

DETAILED DESCRIPTION

The present subject matter relates to methods and systems for extracting issues based on ticket mining. For example, textual description of a ticket is mined to extracted issues therefrom.

With the increasing reliance of business on information technology (IT), the health of computing systems in an IT infrastructure is continuously monitored and managed by a team of resolvers employed by IT service providers. Issues in the computing systems are reported in the form of tickets, such as trouble tickets. The trouble tickets are reported to the team of resolvers in two ways, namely, system-generated tickets and user-generated tickets.

Generally, a ticket contains various details of a reported issue, such as reporting time, system-of-origin, severity, and other details. Also, the ticket contains a textual description that contains the details of the issue. In case of the system-generated tickets, the textual description is automatically generated by known ticketing tools implemented by the team of resolvers. The textual description, of the system-generated tickets, is generally structured and is based on how the ticketing tools have been configured to report the issue. However, in case of the user-generated tickets, the textual description contains free-form text written by users of the computing devices. The textual description of the user-generated tickets is normally unstructured and contains variations, ill-formed sentences, and spelling and grammar mistakes.

As described above, the ticket may include information of an actual issue which is hidden in the textual description along with other information. It is important to extract the information of the actual issue referred by the ticket. For example, consider the following textual description of a system-generated ticket:

ControlM Alert job=orahAAAA04 memname=orahotback.sh node=aaaa04 msg=sev3 job failed AAAA04

The issue referred by the textual description is of the system-generated ticket is:

"ControlM Alert job failed"

The textual description of the system-generated ticket contains other details such as name of the application job=orahAAAA04, name of the script memname=orahotback.sh, and severity level msg=sev3. Hence, in order to extract the actual issue from the textual description of the system-generated ticket, factual knowledge of the actual issue has to be separated from the specific details of individual manifestations.

Further, different system-generated tickets may include different textual descriptions for same issue. For instance, the above example of the textual description can also be reported in another system-generated ticket as:

ControlM Sev 3 Alert on Job Failure: job=orahAAAA04, script orahotback.sh

As can be appreciated by those skilled in the art, the different system-generated tickets report the same issue using the different textual descriptions, when different IT service providers customize structure of the textual descriptions according to their own preferences or formats. Such customization of the structure of the textual descriptions may lead to confusion of the teams of resolvers who are not aware of the preferences or formats of the different IT service providers. Hence, the extraction of the issue based on the textual descriptions of the system-generated tickets is an inconvenient and time consuming process.

Further, in case of the user-generated tickets, the reporting of an issue through textual descriptions becomes even more challenging because the textual descriptions in the user-generated tickets are written in free-form text. Such free-form text is often ambiguous, and contains lack of structure, too many variations, and spelling and grammar errors. For instance, consider an issue:

"application not responding"

The issue can be reported by different users in a variety of textual descriptions, such as,
 application hung,
 application dead,
 no response from application for last 5 mins, or
 application not responding for the fifth time since morning.

Such variations in textual description of the same issue through the user-generated tickets may lead to confusion and inaccuracy in extracting actual issue.

Hence the extraction or mining of the issues from the textual descriptions presents several challenges for the system-generated tickets as well as the user-generated tickets.

One conventional approach adopted by the IT service providers for extraction of the issues is to rely either on coarse-grained information from the ticketing tools or on intuition-driven inputs provided by the team of resolvers. Existing ticketing tools, such as ServiceNow and BMC Remedy allow the team of resolvers or the users of the computing systems to classify the tickets in various categories and subcategories. Such categories are often referred as Category, Type, Item, and Summary (CTIS). However, the team of resolvers and the users may make mistakes in rightly classifying the tickets. As a result, an analysis which is based simply on the classification of the tickets may lead to incorrect and insufficient extraction of the issues.

Another conventional approach adopted by the IT service providers for extracting the issues is to analyze fixlogs used for ticket resolution. The fixlogs may be understood as documents containing details of resolution steps to act on previously extracted issues. In an example, a resolver after acting on an issue makes an entry in a fixlog to docket the resolution steps used to resolve the issue. However, there are several practical challenges faced with the fixlogs by the IT service providers. For instance, the resolvers often do not make an entry in the fixlogs. As a result, the fixlogs are not available for all issues. Moreover, the fixlogs are generic and can be used for multiple issues.

Yet another conventional approach adopted by the IT service provider for extracting the issues is a manual intuition-driven approach. In this conventional approach, the IT service providers extract information about issues from monthly reports generated manually by team of resolvers or by domain experts. However, since the monthly reports are generated manually, there is a risk of being incomplete and inaccurate extraction of information about issues.

To overcome the various practical challenges of the conventional approaches, various embodiments described herein, in accordance with the present subject matter, include methods and systems for extracting issues based on ticket mining. The methods and systems according to the present subject matter may be employed for mining of tickets, i.e., trouble tickets, reporting issues of computing systems. The mining of the tickets include receiving a plurality of tickets including descriptions of issues in the computing systems. In an example, the descriptions include one of a structured data and an unstructured data. The descriptions with structured data are system-generated descriptions, while the descriptions with unstructured data are user-generated descriptions. Once the plurality of tickets are received, the descriptions of the plurality of the tickets are first cleaned by removing unwanted details to obtain clean descriptions. In an example, the cleaning of the descriptions may be customized by knowledge of specific domains to ensure that all domain-specific words, patterns, and phrases are retained during the cleaning.

The clean descriptions are then mapped with a service catalog data retrieved from a database, to obtain unmapped clean descriptions. In an example, the identification of frequently occurring issues observed in specific domains may assist service providers to prepare the service catalog data. For instance, the service catalog data of a technology domain of Oracle may contain a list of frequently occurring issues in Oracle, such as tablespace full, query running slow, index not built, etc. The service catalog data may be used by the IT service providers for knowledge acquisition of the frequently occurring issues. Such knowledge of the frequently occurring issues can also be used to prepare training plans to train resolvers with appropriate skills. Further, the service catalog data may be used to mine or extract the frequently occurring issues from the clean descriptions of the plurality of tickets.

In an implementation, the present subject matter is implemented independent of any specific technology domain, and is designed to be configurable to extract issues from descriptions of any domain. However, the effectiveness of the present implementation can be significantly increased by domain-specific customizations of the steps of descriptions cleaning and service catalog data mapping. To do so, the present subject matter proposes making cartridges for technology domains, for example, Unix, Oracle, Windows, etc.; business domains, for example, banking, retail, finance, etc.; and tool domains, for example, BMC Patrol, Control M, Tivolli TWS, Autosys, etc. For each domain, a dictionary of domain-specific words is maintained and patterns, to include or exclude, while extracting the issues. In addition, the present subject matter describes maintaining the service catalog data of known issues within a domain.

In an implementation, upon obtaining the unmapped clean descriptions as a result of the service catalog data mapping, a determination of the unstructured data in the unmapped clean descriptions is carried out. As mentioned above, the descriptions with the unstructured data are user-generated descriptions, while the decryptions with structured data are system-generated descriptions. Also, as there exist inherent difference in the structure and heterogeneity of the user-generated descriptions and the system-generated descriptions, the present subject matter employs different techniques to extract issues from the user-generated descriptions and the system-generated descriptions.

In an example, in case the unstructured data is determined in the unmapped clean descriptions, then the unmapped clean descriptions are identified as the user-generated descriptions. The user-generated descriptions demonstrate too many variations. To address such variations, various pre-processing techniques are applied on the user-generated descriptions. The various pre-processing techniques may include stemming, synonym detection, and spelling corrections. Thereafter, keywords are extracted and similar issues are grouped based on the commonality of the keywords. Each group is represented using n-grams of keywords. The n-grams of keywords are then extracted as the issues present in the computing systems.

In an alternative example, in case the unstructured data is not determined in the unmapped clean descriptions, then the unmapped clean descriptions are identified as the system-generated descriptions. The system-generated descriptions have a fixed structure and limited variations. Hence, a clustering technique is used to group similar issues into number of clusters. For each cluster from amongst the number of clusters, a label that best represents the unmapped clean descriptions in that cluster is provided. The labels of all the clusters are then extracted as the issues present in the computing systems.

Accordingly, the present subject matter uses information retrieval techniques along with domain knowledge to extract the issues from the unmapped clean descriptions of the plurality of tickets. The present subject matter employs different techniques to extract the issues from the user-generated descriptions and the system-generated descriptions.

Also, the extraction of the issues in accordance with the present subject matter may assist in improving an IT infrastructure by inferring issue trends and frequent problematic areas in the computing systems of the IT infrastructure. From the issues extracted, issues referred by high-severity tickets can provide insights into critical areas that cause customer unrest or business instability. Such issues may then be prioritized for taking corrective actions by the team of resolvers.

Further, information about the issues, in accordance with the present subject matter, from the unmapped clean descriptions can be used to identify issues that consume maximum effort of the team of resolvers or human resources. Such issues can be considered for full or partial automation of the computing systems being monitored.

Thus, the extraction of the issues from the unmapped clean descriptions, with the implementation of the present subject matter, can provide crucial information for better understanding and controlling of IT operations. Also, the extraction of the issues, with the implementation of the present subject matter, can assist in improving both IT system and human system involved in the IT operations. The IT system consists of business functions, applications, and the IT infrastructure. The human system consists of teams of resolvers that manage the IT system.

Furthermore, the description hereinafter of the present subject matter includes various specific details to assist in that understanding but these are to be regarded as merely exemplary. Accordingly, those of ordinary skill in the art will recognize that various changes and modifications of the embodiments described herein can be made without departing from the scope of the present subject matter. In addition, descriptions of well-known functions and constructions may be omitted for clarity and conciseness.

The terms and words used in the following description are not limited to the bibliographical meanings, but, are merely used by the inventor to enable a clear and consistent understanding of the present subject matter. Accordingly, it should be apparent to those skilled in the art that the following description of exemplary embodiments of the present subject matter is provided for illustration purpose only and not for the purpose of limiting the present subject matter.

It should be noted that the description merely illustrates the principles of the present subject matter. It will thus be appreciated that various arrangements may also be employed that, although not explicitly described herein, embody the principles of the present subject matter and are included within its spirit and scope. Furthermore, all examples recited herein are principally intended expressly to be only for explanation purposes to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof. The manner in which the methods shall be implemented onto various systems has been explained in detail with respect to the FIGS. 1-3. While aspects of described systems and methods can be implemented in any number of different computing devices and/or configurations, the embodiments are described in the context of the following system(s).

FIG. 1 illustrates a network environment 100 implementing an issue extraction system 102, in accordance with an embodiment of the present subject matter.

In one implementation, the network environment 100 can be a public network environment, including thousands of personal computers, laptops, various servers, such as blade servers, and other computing systems. In another implementation, the network environment 100 can be a private network environment with a limited number of computing systems, such as personal computers, servers, and laptops.

The issue extraction system 102 may be implemented in a variety of computing systems, such as a laptop computer, a desktop computer, a notebook, a workstation, a mainframe computer, a server, a network server, and the like. Further, it will be understood that the issue extraction system 102 is connected to a plurality of user computing systems 104-1, 104-2, 104-3 . . . , and 104-N, collectively referred to as computing systems 104 and individually referred to as a computing system 104. As shown in FIG. 1, the computing systems 104 are communicatively coupled to the issue extraction system 102 over a network 106 through one or more communication links. The computing systems 104 may include, but is not limited to, desktop computers, portable computers, handheld computing devices, and workstations.

In one implementation, the network 106 may be a wireless network, a wired network, or a combination thereof. The network 106 may also be an individual network or a collection of many such individual networks, interconnected with each other and functioning as a single large network, e.g., the Internet or an Intranet. The network 106 may be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

The network environment 100 further comprises a database 108 communicatively coupled to the issue extraction system 102. Although the database 108 is shown external to the issue extraction system 102, it will be appreciated by a person skilled in the art that the database 108 can also be implemented internal to the issue extraction system 102.

According to an implementation, the issue extraction system 102 includes processor(s) 110, interface(s) 112, and memory 114 coupled to the processor(s) 110. The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 may be configured to fetch and execute computer-readable instructions stored in the memory 114.

The memory 114 may include any computer-readable medium known in the art including, for example, volatile memory, such as static random access memory (SRAM), and dynamic random access memory (DRAM), and/or nonvolatile memory, such as read only memory (ROM), erasable programmable ROM, flash memories, hard disks, optical disks, and magnetic tapes.

Further, the interface(s) 112 may include a variety of software and hardware interfaces, for example, interfaces for peripheral device(s), such as a product board, a mouse, an external memory, and a printer. Additionally, the interface(s) 112 may enable the issue extraction system 102 to communicate with other devices, such as web servers and external repositories. The interface(s) 112 may also facilitate multiple communications within a wide variety of networks and protocol types, including wired networks, for example, LAN, cable, etc., and wireless networks, such as WLAN, cellular, or satellite. For the purpose, the interface(s) 112 may include one or more ports.

The issue extraction system 102 also includes module(s) 116 and data 118. The module(s) 116 include, for example, a data preparation module 120, a mapping module 122, an issue extraction module 124, and other module(s) 126. In an example, the issue extraction module 124 includes construction module 128 and a clustering module 130. The other module(s) 126 may include programs or coded instructions that supplement applications or functions performed by the issue extraction system 102. The data 118 may be domain dictionary data 132, service catalog data 134, and other data 136. The other data 136, amongst other things, may serve as a repository for storing data that is processed, received, or generated as a result of the execution of one or more modules in the module(s) 116.

Although the issue extraction system 102 is described as a part of the network environment 100, the issue extraction system 102 may be implemented in other networks providing data connectivity, albeit with a few variations, as will be understood by a person skilled in the art.

Figure 2:
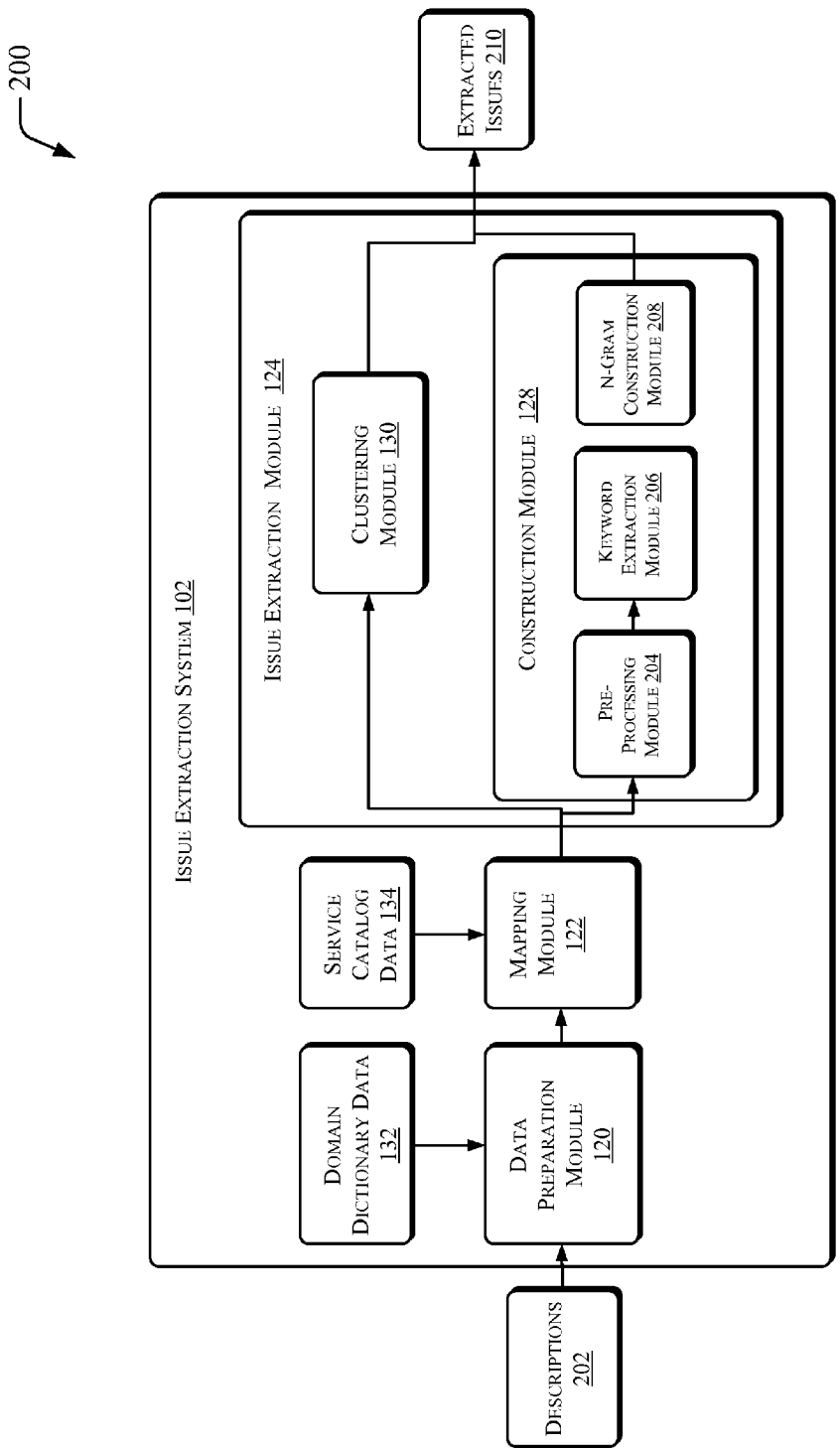
FIG. 2 illustrates a functional diagram of the issue extraction system, according to an implementation of the present subject matter.

The working or operation of the issue extraction system 102, illustrated in FIG. 1, is described in detail with reference to FIG. 2 in the description hereinafter. FIG. 2 illustrates exemplary method 200 for extracting the issues from descriptions of a plurality of tickets, i.e., trouble tickets, received at the issue extraction system 102, in accordance with one implementation of the present subject matter. The exemplary method 200 is described in the general context of computer executable instructions. Generally, computer executable instructions can include routines, programs, objects, components, data structures, procedures, modules, functions, etc., that perform particular functions or implement particular data types.

Further, the order in which the method 200 is described is not intended to be construed as a limitation, and any number of the described method blocks can be combined in any order to implement the method, or an alternative method. Additionally, individual blocks may be deleted from the method without departing from the scope of the subject matter described herein.

Figure 3:
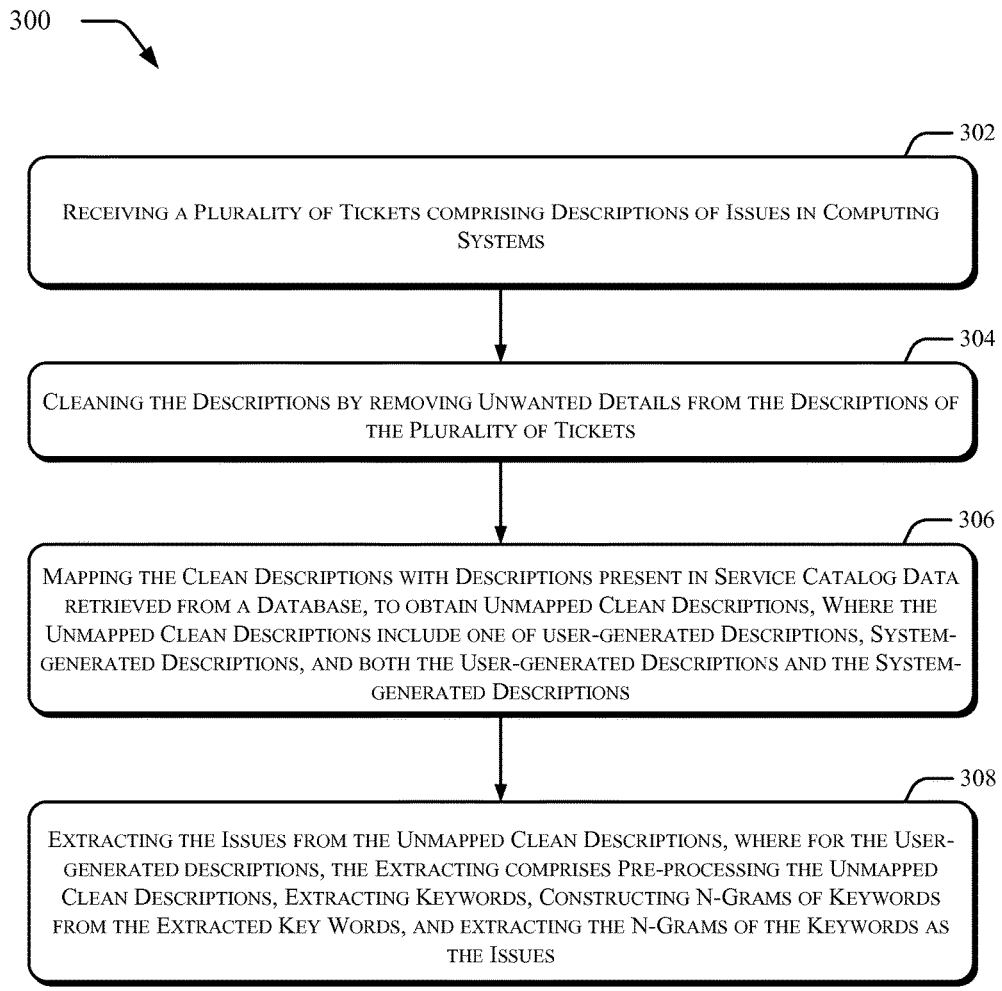
FIG. 3 illustrates a method for extracting issues based on ticket mining, according to an implementation of the present subject matter.

As can be seen from FIG. 3, the data preparation module 120 of the issue extraction system 102 may retrieve or receive a plurality of tickets (trouble tickets) from the computing systems 104 on regular intervals. The plurality of tickets include descriptions 202, i.e., textual descriptions. In the description hereinafter, the descriptions 202 are collectively referred to as descriptions 202 and individually referred to as a description 202.

In an example, the plurality of tickets include the descriptions 202 about issues encountered by the computing systems 104. As discussed earlier, the issues are problems encountered by any of the computing systems 104 and are reported through the descriptions 202 of the plurality of tickets. The descriptions 202 generally contain lot of additional information such as timestamp, location, threshold, system-of-origin, severity, etc. Such additional information changes when the same issue occurs at different timestamp, location, system-of-origin, etc. Although the additional information is important; however, the additional information may mislead the process of issue extraction. Hence, the additional information is to be separated from the descriptions 202 for retrieving actual issues. For example, consider a description such as:

"Unix server dt2n1g1 down"

Here, the actual issue is:

"Unix server down"

In the above example, the name of system-of-origin "dt2n1g1" is the additional information and is not required for the purpose of issue extraction.

Now, the challenge for the issue extraction system 102 is to find a set of words that should be removed as being the additional information, and a set of words that should be retained as being issue information. For removal or retaining a set of words form the received descriptions 202, the data preparation module 120 may clean the descriptions 202 of the plurality of tickets by preparing and storing an 'Include list' and an 'Exclude list' in the issue extraction system 102. In an example, the Include list and the Exclude list are collectively stored as the domain dictionary data 132 in the issue extraction system.

In an example, the Include list may include domain-specific non-English words and captures knowledge about a particular domain. Some exemplary words in the Include list, for instance, for Unix domain, may include, FSCapacity Alarm, SwapPercentUsed, and the like. The words in the Include list are retained in the descriptions 202 by the data preparation module 120 as these words may describe the issue. In accordance with the present subject matter, the Include list is populated or updated by subject matter experts (SME) of respective domains.

In an example, the Exclude list may include domain-specific English words. Some exemplary words in the Exclude list may include export, home, etc., for example, for the domain of Unix. The data preparation module 122 makes use of the Exclude list to remove such domain-specific English words from the descriptions 202.

Further, the data preparation module 122 may provide a lever to detect patterns in the form of regular expressions. For example, in case of Oracle, the Include list may include patterns such as ora* that denotes Oracle errors and memname=*.sh that denotes the shell script.

Yet further, the present subject matter also considers that the issues are generally reported through different types of words, such as English dictionary words and domain-specific words, either related or unrelated to the issues.

In an example, there may be a case where the descriptions 202 of the issues are reported through English dictionary words. Considering some below listed examples of such descriptions:

i). A-IM002930432.P1 reset the Unix password for login id bchho02 @ 156.5.238.69, ii) 27488732 CREATED unable to backup data after upgrade to windows 7, iii) A-IM002971223 {Need to revoke admin access, and iv) Domain Drive M:\setting\application data\SAP access denied.

As can be seen, the above descriptions infer issues in English dictionary words, while all other details are non-English words. For example, in description i) the description represents an issue by "reset the Unix password for login id". All the other words, such as A-IM002930432, P1, and bchho02 @ 156.5.238.69, are all non-English words.

In another example, there may be a case in which some domain-specific words related to an issue are non-English words. Consider a description as "Portal Alert on appax040 at 2012-07-11:11:44:40.000 SwapPercentUsed is CRITICAL". Ideally, the issue inferred in the description is "Portal alert for SwapPercentUsed is critical". Hence, with the approach of retaining only English dictionary words, the issue can be identified as "Portal alert for is critical". Here, SwapPercentUsed is a non-English word, and without this non-English word the issue is meaningless. Thus, the data preprocessing module 120 ensures that a meaningful issue is extracted from the descriptions 202 of the plurality of tickets.

Further, there may be case in which some domain-specific words may not be related to the issue but are English. In such cases, some English dictionary words have to be excluded since they are domain-specific names of system-of-origin. Consider a description: Portal alert on d-6x9ttk1: /export/ home FileSystem is full. The approach of retaining only English dictionary words may extract issue as "Portal alert on export home filesystem is full". In Unix, name of the filesystem often contains folder names such as home, root, export, etc. Hence, we exclude such words while inferring an issue from the descriptions 202 of the plurality of tickets.

In an example, the data preparation module 120 may use the below mentioned pseudo code for the data preparation:
1. Input: and Output
   Input: Dr=List of description, D=List of dictionary words, I=List of include words, E=List of exclude words, S=List of special characters
   Output: Dc=List of cleaned description
2. Prepare a list of words, W, by tokenizing all descriptions in Dr by space.
3. For each word in the list of words, W,
   check if word is a subset of domain include list, I
   If no, tokenize word by special characters, S and add it to W.
4. Prepare a list of non-dictionary words, ND=W−(D+I)
5. Add list of exclude words to non-dictionary words list, ND=ND+E.
6. Remove non-dictionary words in ND from descriptions Dr to make a list of cleaned descriptions, Dc=Dr−ND.

As mentioned above, the data preparation module 120 cleans the descriptions by removing or retaining a set of words from the descriptions 202. For removing or retaining a set of words during the cleaning process, the data preparation module 120 refers to the prepared domain dictionary data 132. Consequently, the data preparation module 120 cleans the descriptions 202 retrieved from the computing systems 104 and provides clean description to the mapping module 122.

The mapping module 122 may map clean descriptions received from the data preparation module 120 with descriptions stored in the service catalog data 134. In an example, the service catalog data 134 may be stored in the issue extraction system 102 or may be external to the issue extraction system 102, such as in the database 108 associated with the issue extraction system 102. The service catalog data 134 of a domain may be understood as a predefined set of descriptions of issues in that domain for which resolution steps are known. Also, the service catalog data 134 may include factual knowledge of issues in the domain. The service catalog data 134 is based on various technologies implemented in information technology (IT) infrastructure, such as Unix, Linux, Oracle, Windows, etc. In an example, the service catalog data 134 is provided with a search guide and is allowed for being customized for each domain. Hence, many descriptions of issues that are otherwise difficult to extract, can be easily extracted. For example, consider a description as "D-8Y6TTK1—cluster failover issue". Such description can be easily mapped to a service catalog item "Cluster FailOver/FallBack" in Linux service catalog.

Further, in an example, the service catalog data 134 is structured, well defined, and contains known and finite set of descriptions of issues. On the other hand, the clean descriptions of the plurality of tickets are unstructured, unknown, and can occur in various ways. The challenge of the present subject matter is to map the clean descriptions with service catalog items of the service catalog data 134. Each of the service catalog items is defined as a two-tuple <action object>. For example, action=create, and object=table. However, the clean descriptions of the plurality of tickets may refer to actions in different ways. For example, create table can be referred as make table, construct table, etc. Hence, to best map the service catalog data 134 to the clean descriptions of the plurality of tickets, the mapping module 122 may construct multiple synonyms of an action. Thus, for a service catalog item, if both object and action are present in the clean descriptions of the plurality of tickets, then the mapping module 122 maps the clean descriptions to corresponding service catalog item of the service catalog data 134, for obtaining unmapped clean descriptions of the plurality of tickets.

In an implementation, various scenarios may arise while mapping the clean descriptions to the service catalog data 134. In one scenario, one service catalog item of the service catalog data 134 may map to multiple clean descriptions. As the clean descriptions contain many variations of the action and the object, these clean descriptions may be mapped to a single service catalog item of the service catalog data 134 by the mapping module 122. For example, consider the clean descriptions as Unlock account, Unlock password of my account, Requesting unlocking of account. All these clean descriptions contain <action object> pair <unlock account>. As a result, the all clean descriptions map to a service catalog item "UnlockAccount" of the service catalog data 134.

In another scenario, one clean description may map to many service catalog items of the service catalog data 134. For example, when an issue is composite, the mapping module 122 may map one clean description to many service catalog items of the service catalog data 134. Further, consider a clean description as "After installing Windows 7, system is very very slow. For unlocking machine, system takes more than 20 min. Please resolve this ASAP." One skilled in the art can understand that an actual issue might be "(a) windows installation problem, or (b) account related unlocking problem." Here, the clean description contains multiple <action object> pairs, such as <install windows>, or <unlock system>, which map to multiples service catalog items of the service catalog data 134.

In another scenario, the mapping module 122 may map one clean description to many service catalog items of the service catalog data 134 when the service catalog data 134 is too detailed. Consider a clean description as "backup failure." This clean description may get mapped to multiple service catalog items provided as (a) Full backup failure, (b) Incremental backup failure, (c) Differential backup failure, (d) Cumulative backup failure, (e) Archive log backup failure.

The pseudo code for mapping descriptions to service catalog item is provided as:
1. Input and Output:
   Input: $D_c$=List of clean description SC=Service catalog
   Output: Mapping $<d_i, SC_j>$
2. For each cleaned description $d_i$ in $D_c$:
   For each item $SC_j$ in service catalog SC with object $O_j$ and action $A_j$. If object, $O_j$ and action $A_j$ keywords are present, assign the corresponding service catalog item to clean description $d_i$ Thus, by mapping the clean descriptions with the service catalog data 134, the mapping module 122 may provide unmapped clean descriptions which are not mapping to any service catalog items present in the service catalog data 134. The unmapped clean descriptions are then forwarded to the issue extraction module 124 by the mapping module 122.

Further, the issue extraction module 124 is implemented to extract the issues from the unmapped clean descriptions. The unmapped clean descriptions can be either user-generated descriptions, the system-generated descriptions, or both the user-generated descriptions and the system-generated descriptions. Also, as there exist inherent difference in the structure and heterogeneity of the user-generated descriptions and the system-generated descriptions, the present subject matter employs different techniques to extract issues from the user-generated descriptions and the system-generated descriptions.

In an example, in case unstructured data is determined in the unmapped clean descriptions, then the unmapped clean descriptions are identified as the unmapped clean user-generated descriptions, or simply user-generated descriptions. In order to extract the issues from the user-generated descriptions, the issue extraction module 124 may include the construction module 128. As the user-generated descriptions are free-form text which is primarily written by users who face issues with the computing systems 104. Such user-generated descriptions include lot of ambiguity, grammatical errors, spelling mistakes, different form of same words, etc. Such variations in textual description of the same issue through the user-generated descriptions may lead to confusion and inaccuracy in extracting actual issue. For example, consider user-generated descriptions, such as job running late, job execution delayed, and abnormal delay observed on job executions. All these user-generated descriptions infer the same issue, i.e., job running late, but are written differently. To overcome this problem, the construction module 128 may include pre-processing module 204 to employ different levers. For example, the levers may include stemming, spelling correction, and synonyms. The users of the computing systems 104 may write same words in different forms such as lock, locked, freeze, freezing, connecting, connect, etc. according to their position in user-generated descriptions. The preprocessing module 204 makes use of Porter stemmer algorithm and replaces such same words with their root words. For example, words, such as locked, freezing, and connecting, would be replaced with lock, freeze, and connect.

In an example, the pre-processing module 204 may also perform spelling correction. The pre-processing module 204 may identify and spelling mistakes in words of the user-generated descriptions and perform spelling correction. For example, user-generated descriptions may often include password as, passwd, password, and etc. By performing the spelling correction, the pre-processing module 204 may correct these words. Further, the pre-processing module 204 may consider examples such as (i) remove and delete, (ii) modify and change, (iii) big and large, etc. As such words are often used in place of each other by the users of the computing system 104, the pre-processing module 204 may make use of WordNet, which is a lexical database for English language, to automatically detect synonym words and make them consistent. The pre-processing module 204 ensures that all variations in the user-generated descriptions are made consistent.

After performing preprocessing, including stemming, spelling correction, and synonyms, on the unmapped clean user-generated descriptions, the pre-processing module 204 provides processed unmapped clean user-generated descriptions or simply processed user-generated descriptions.

Further, in an implementation, the issue extraction module 124 may include a keyword extraction module 206. The keyword extraction module 206 may consider nouns, adjectives, verbs, and adverbs for extraction of the keywords from the processed user-generated descriptions. The keyword extraction module 206 may extract keywords which occur frequently, such as job, memory, filesystem, swap, etc., from the processed user-generated descriptions. From the frequently occurring keywords, top frequently occurring keywords are identified by the keyword extraction module 206 to form clusters based on similarities between the processed user-generated descriptions. Large the number of keywords considered, larger is the number of processed user-generated descriptions for which the keyword extraction module 206 can extract the issues and hence a larger coverage.

The issue extraction module 124 may further include an n-gram construction module 208. The n-gram construction module 208 may construct n-gram out of these extracted keywords. To do so, the n-gram construction module 208 may tag each of the extracted keywords to the processed user-generated descriptions where they occur. For each extracted keyword, the n-gram construction module 208 may identify the processed user-generated descriptions to which they are tagged and extend the extracted keyword to form n-grams by identifying other words which appear in the processed user-generated descriptions. Hence, n-grams are made of the extracted keywords such as, job failure, high memory utilization, filesystem backup, create swap space, etc. The n-grams describe the issues in a better way. Each of these n-grams represent the issues and is mapped to the processed user-generated descriptions.

Further, in an implementation, a set of the processed user-generated descriptions corresponding to each n-gram represents a cluster. Yet further, the n-gram is considered as a label of the cluster as well. In an example, a longer n-gram enables a better explanation of the issue and larger correctness. Thereafter, the n-grams of keywords are provided as extracted issues by the construction module 128.

The pseudo code for extracting the issues from the processed user-generated descriptions is:
1. Input and Output
   Input: $D_c$=List of clean description
   Output: Mapping $<d_i$, Issue label$>$
2. Compute all one words and their frequency of occurrence in clean descriptions.
3. Select top k one words as keywords.
4. For each word, construct n-gram until the issue is explained by n-gram.
5. These set of n-grams represent issues. Assign all n-grams to clean descriptions.

In an example, in case structured data is determined in the unmapped clean descriptions, then the unmapped clean descriptions are identified as the unmapped clean system-generated descriptions, or simply system-generated descriptions. In order to extract the issues from the system-generated descriptions, the issue extraction module 124 may include a clustering module 130. As mentioned above, the information unrelated to an issue is separated from the descriptions by the data preparation module 120. However, the clean descriptions still contain variations based on the configuration of the ticketing tools for different applications in the issue extraction system 102. The clustering module 130 may cluster the system-generated descriptions based on similarity. Clustering helps grouping similar system-generated descriptions together and assign dissimilar system-generated descriptions to separate groups.

In an example, considering two system generated descriptions as:
BMC portal alert on d-hw6ttk1-lvmh: /var for filesystem full, and
BMC portal critical alert on d-hw6ttk1-lvmh/var for filesystem full.

After cleaning, the system-generated descriptions become:
BMC portal alert on filesystem full, and
BMC portal critical alert on filesystem full.

These two system-generated descriptions are same except the word critical present in second system-generated description. The clustering module 130 may group such similar system-generated descriptions into one cluster by computing similarity between two system-generated descriptions.

In an example, some of the approaches to compute similarity between two system-generated descriptions are Jaccard coefficient, Dice coefficient, etc. Dice coefficient gives twice the weight to common elements. Since the present subject matter emphasizes on similarity, the clustering module 130 may use Dice coefficient to compute similarity between two system-generated descriptions. Let A and B be sets of words in two system-generated descriptions. Dice similarity, D, between A and B is defined in equation (1) as follows:

$$D = \frac{2*|A \cap B|}{|A| + |B|} \quad (1)$$

For example, if
A=BMC portal alert on filesystem full, and
B=BMC portal critical alert on filesystem full,
then |A|=6, |B|=7, |A∩B|=6 and $$D = \frac{2*6}{7+6} = 0.923.$$

The clustering module 130 may compute Dice similarity between every pair of the unmapped clean system-generated descriptions. Further, the clustering module 130 may construct a similarity graph of the unmapped clean system-generated descriptions in which nodes are the unmapped clean system-generated descriptions. There is an edge between two unmapped clean system-generated descriptions if they are similar.

In the present subject matter, two unmapped clean system-generated descriptions are considered similar if the similarity coefficient between them is greater than a predefined threshold similarity. The clustering module 130 may cluster unmapped clean system-generated descriptions by applying graph clustering on the similarity graph of unmapped clean system-generated descriptions.

In an implementation, various graph clustering techniques, such as cliques, connected components, graph partitioning, graph cuts, etc., can be used for clustering. In an example, the clustering module 130 uses cliques to identify clusters of the unmapped clean system-generated descriptions.

In an implementation, a single cluster may contain many variations of the unmapped clean system-generated descriptions. The clustering module 130 may further be configured to provide a label to each cluster that best represents all the members within a cluster. The set of common words from all the unmapped clean system-generated descriptions within a cluster are considered as probable candidate for a cluster label, by the clustering module 130. If these common words are arranged in any order, then the cluster label cannot be easily understood and is not meaningful. For example, a label "host connect unable to" does not make sense. For example, the correct order of words for the previous example is "unable to connect host". One of the criteria to compute the position of a word is based on its position in individual the unmapped clean system-generated description. For instance, the word that occurs most frequently on $1^{st}$ position is placed in the $1^{st}$ position in the label. Thus, the clustering module 130 may position the words in the cluster label. Thereafter, the labels of the clusters are provided as extracted issues 210 by the clustering module 130.

The pseudo code of clustering and labeling techniques is provided as:
1. Input and Output:
    Input: $D_c$=List of clean description, threshold_similarity=similarity threshold
    Output: Mapping <$d_i$, Issue label>
2. Compute dice similarity for each pair of the clean description <$d_i$, $d_j$> in $D_c$,
    IssueAdjacencyMatrix[i,j]=Dice similarity coefficient
3. Build adjacency matrix for the issue-similarity graph
    If (IssueAdjacencyMatrix[i,j]≥threshold_similarity),
    IssueAdjacencyMatrix[i,j]=1
    else IssueAdjacencyMatrix[i,j]=0
4. Identify a maximum clique $C_k$ in IssueAdjacencyMatrix
5. Remove issues identified in clique $C_k$ from IssueAdjacencyMatrix.
6. Repeat step 4 till all issues are covered
7. For each clique $C_k$, identify a label
    Identify set of common words $C_w$ from the set of clean description belonging to the clique.
    For each word w in $C_w$,
        Compute its position in set of clean description belonging to clique, p=Mode of the position of the word w
    Label of the clique=Arrangement of the words in $C_w$ according to p FIG. 3 illustrates a method 300 for extracting issues based on ticket mining, according to an implementation of the present subject matter. The method 300 is implemented in computing system, such as an issue extraction system 102. The method 300 may be described in the general context of computer executable instructions. Generally, computer executable instructions may include routines, programs, objects, components, data structures, procedures, modules, functions, etc., that perform particular functions or implement particular abstract data types. The method 300 may also be practiced in a distributed computing environment where functions are performed by remote processing devices that are linked through a communications network.

The order in which the method 300 is described is not intended to be construed as a limitation, and any number of the described method blocks can be combined in any order to implement the method 300, or an alternative method. Furthermore, the method 300 can be implemented in any suitable hardware, firmware or combination thereof.

At block 302, the method 300 includes receiving a plurality of tickets including descriptions of issues in the computing systems. In an example, the descriptions include one of a structured data and an unstructured data. The descriptions with structured data are system-generated descriptions, while the descriptions with unstructured data are user-generated descriptions.

At block 304, once the plurality of tickets are received, the descriptions of the plurality of the tickets are first cleaned by removing unwanted details to obtain clean descriptions. In an example, the cleaning of the descriptions may be customized by knowledge of specific domains to ensure that all domain-specific words, patterns, and phrases are retained during the cleaning.

At block 306, the clean descriptions are then mapped with a service catalog data retrieved from a database, to obtain unmapped clean descriptions. In an example, the identification of frequently occurring issues observed in specific domains may assist service providers to prepare the service catalog data. For instance, the service catalog data of a technology domain of Oracle may contain a list of frequently occurring issues in Oracle, such as tablespace full, query running slow, index not built, etc.

At block 308, the issue extraction module 124 is implemented to extract the issues from the unmapped clean descriptions. The unmapped clean descriptions can be either user-generated descriptions, the system-generated descriptions, or both the user-generated descriptions and the system-generated descriptions. Also, as there exist inherent difference in the structure and heterogeneity of the user-generated descriptions and the system-generated descriptions, the present subject matter employs different techniques to extract issues from the user-generated descriptions and the system-generated descriptions.

In an example, in case the unstructured data is determined in the unmapped clean descriptions, then the unmapped clean descriptions are identified as the user-generated descriptions. The user-generated descriptions demonstrate too many variations. To address such variations, various pre-processing techniques are applied on the user-generated descriptions. The various pre-processing techniques may include stemming, synonym detection, and spelling corrections. Thereafter, keywords are extracted and similar issues are grouped based on the commonality of the keywords. Each group is represented using n-grams of keywords. The n-grams of keywords are then extracted as the issues present in the computing systems.

In an alternative example, in case the unstructured data is not determined in the unmapped clean descriptions, then the unmapped clean descriptions are identified as the system-generated descriptions. The system-generated descriptions have a fixed structure and limited variations. Hence, a clustering technique is used to group similar issues into number of clusters. For each cluster from amongst the number of clusters, a label that best represents the unmapped clean descriptions in that cluster is provided. The labels of all the clusters are then extracted as the issues present in the computing systems.

Thus, the extraction of the issues from the unmapped clean descriptions, with the implementation of the present subject matter, can provide crucial information for better understanding and controlling of IT operations. Also, the extraction of the issues, with the implementation of the present subject matter, can assist in improving both IT system and human system involved in the IT operations. The IT system comprising of business functions, applications, and the IT infrastructure. The human system comprising of teams of resolvers that manage the IT system.

Although embodiments for methods and systems for the present subject matter have been described in a language specific to structural features and/or methods, it is to be understood that the present subject matter is not necessarily limited to the specific features or methods described. Rather, the specific features and methods are disclosed as exemplary embodiments for the present subject matter.

We claim:

1. A processor implemented method for extracting issues based on ticket mining, the method comprising:

receiving a plurality of tickets comprising descriptions of the issues in computing systems, wherein the descriptions include one of a structured data and an unstructured data, and wherein the descriptions with the structured data are system-generated descriptions and the descriptions with the unstructured data are user-generated descriptions;

cleaning the descriptions by the processor by removing unwanted details from the descriptions of the plurality of tickets using a dictionary and patterns, wherein the cleaning of the descriptions is supported by domain specific customizations;

mapping the clean descriptions by the processor with the descriptions stored in service catalog data retrieved from a database, to obtain unmapped clean descriptions, wherein the unmapped clean descriptions include one of the user-generated descriptions, the system-generated descriptions, and both the user-generated descriptions and the system-generated descriptions; and extracting the issues by the processor from the unmapped clean descriptions, wherein the unmapped clean descriptions include the user-generated descriptions, the extracting comprises:

pre-processing the unmapped clean descriptions, wherein the pre-processing comprises stemming, synonym detection, and spelling corrections;

determining keywords from the processed unmapped clean descriptions;

constructing n-grams of keywords from extracted keywords, the n-grams of keywords representing issues described in the extracted keywords; and extracting the n-grams of keywords as the issues present in the computing systems.

2. The processor implemented method as claimed in claim 1, wherein the unmapped clean descriptions include the system-generated descriptions, the extracting comprises:

clustering the unmapped clean descriptions into separate clusters based on similarity;

labeling each of the clusters with a label that represents the unmapped clean descriptions of a cluster; and extracting the labels as the issues present in the computing systems.

3. The processor implemented method as claimed in claim 1, wherein the cleaning comprising retaining domain-specific words using knowledge of a plurality of domains.

4. The processor implemented method as claimed in claim 1, wherein the service catalog data comprises the descriptions associated with a set of issues for which resolution steps are known.

5. The processor implemented method as claimed in claim 1, wherein the pre-processing comprises one of stemming, synonym detecting, and spelling correcting of the unmapped clean descriptions.

6. The processor implemented method as claimed in claim 1, wherein the constructing comprises:
grouping similar keywords based on similarity between the keywords; and
labeling each group using the n-grams of keywords.

7. An issue extraction system for extracting issues based on ticket mining, the system comprising:
a processor;
a data preparation module, coupled to the processor, to:
receive a plurality of tickets comprising descriptions of the issues in computing systems, wherein the descriptions include one of a structured data and an unstructured data, and wherein the descriptions with the structured data are system-generated descriptions and the descriptions with the unstructured data are user-generated descriptions; and
clean the descriptions by removing unwanted details from the descriptions of the plurality of tickets using a dictionary and patterns, wherein the cleaning of the descriptions is supported by domain specific customizations;
a mapping module, coupled to the processor, to map the clean descriptions with descriptions present in service catalog data retrieved from a database, for obtaining unmapped clean descriptions, wherein the unmapped clean descriptions include one of the user-generated descriptions, the system-generated descriptions, and both the user-generated descriptions and the system-generated descriptions; and
an issue extraction module coupled to the processor, wherein the unmapped clean descriptions include the user-generated descriptions, the issue extraction module is adapted to:
pre-process the unmapped clean descriptions, wherein the pre-processing includes stemming, synonym detection, and spelling corrections;
determine keywords from the processed unmapped clean descriptions;
construct n-grams of keywords from extracted keywords, the n-grams of keywords representing issues described in the extracted keywords; and
extract the n-grams of keywords as the issues present in the computing systems.

8. The system as claimed in claim 7, wherein the issue extraction module comprises a clustering module, and wherein the unmapped clean descriptions include the system-generated descriptions, the clustering module is adapted to:
cluster the unmapped clean descriptions into separate clusters based on similarity;
label each of the clusters with a label that represents the unmapped clean descriptions of a cluster; and
extract the labels as the issues present in the computing systems.

9. The system as claimed in claim 7, wherein the data preparation module cleans the descriptions by retaining domain-specific words using knowledge of a plurality of domains.

10. The system as claimed in claim 7, wherein the service catalog data comprises the descriptions associated with a set of issues for which resolution steps are known.

11. The system as claimed in claim 7, wherein the issue extraction module comprises a pre-processing module for the pre-processing the unmapped clean descriptions by one of stemming, synonym detecting, and spelling correcting process.

12. The system as claimed in claim 7, wherein the issue extraction module comprises a n-gram construction module to construct the n-grams of keywords from the extracted keywords by:
grouping similar keywords based on the similarity between the keywords; and
labeling each group using the n-grams of keywords.

* * * * *